Sept. 6, 1932.  H. F. NOYES  1,875,755
HANDLING PHOSPHORUS CONTAINING FURNACE GASES
Filed May 25, 1929  2 Sheets-Sheet 1
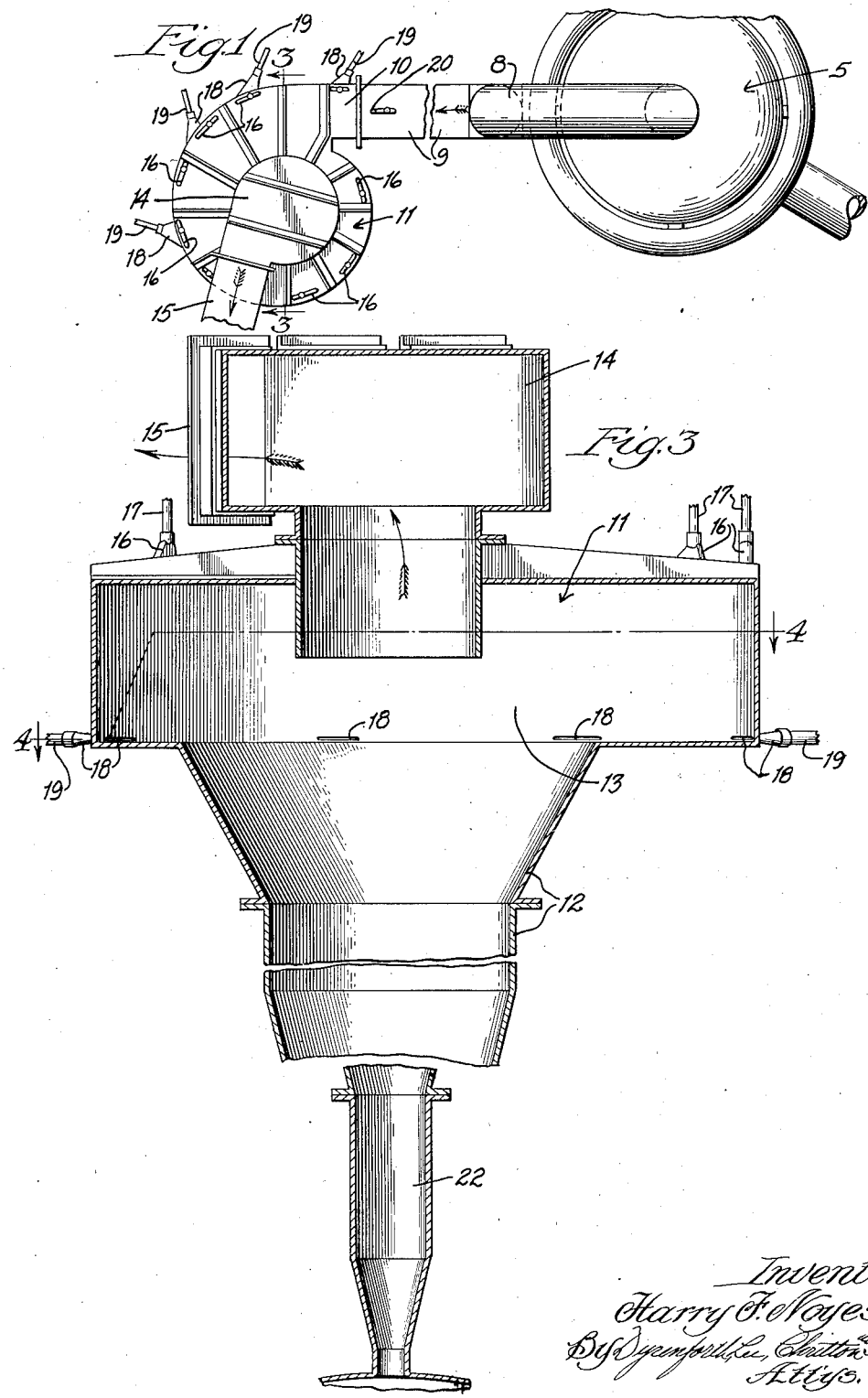

Sept. 6, 1932.  H. F. NOYES  1,875,755
HANDLING PHOSPHORUS CONTAINING FURNACE GASES
Filed May 25, 1929  2 Sheets-Sheet 2
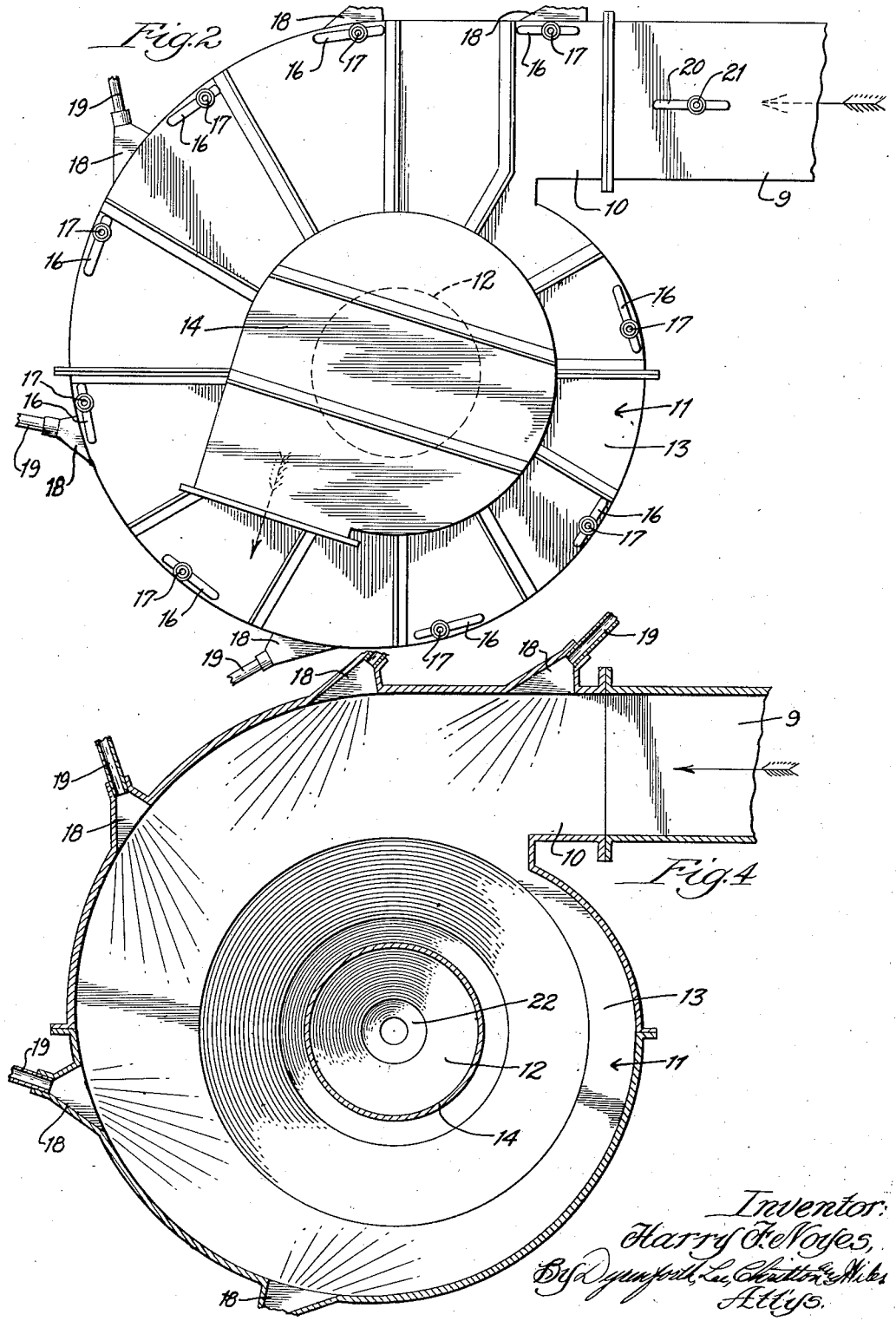

Patented Sept. 6, 1932

1,875,755

UNITED STATES PATENT OFFICE

HARRY F. NOYES, OF CHICAGO HEIGHTS, ILLINOIS, ASSIGNOR TO VICTOR CHEMICAL WORKS, A CORPORATION OF ILLINOIS

HANDLING PHOSPHORUS CONTAINING FURNACE GASES

Application filed May 25, 1929. Serial No. 365,901.

The present invention relates to improvements in the production of phosphorus and more particularly in the cleaning of passages, dust collectors and the like through which the gases from a volatilization furnace producing phosphorus are conducted. It will be fully understood from the following description wherein:

Figure 1 is a plan view of a portion of a plant in connection with which the invention is employed;

Fig. 2 is a plan view on an enlarged scale of a vortical dust collector employed in connection with the present invention;

Fig. 3 is a vertical sectional view on the line 3—3 of Fig. 1; and

Fig. 4 is a horizontal sectional view on the line 4—4 of Fig. 3.

Refering more particularly to the drawings, the numeral 5 indicates a phosphorus volatilization furnace, which may be of either the arc or blast furnace type, but is illustrated in the drawings somewhat diagrammatically as a blast furnace. From the phosphorus furnace, the phosphorus laden gases pass through the downcomer 8 and conduit 9 to the inlet 10 of the dust collector 11, entering the latter tangentially in the upper portion thereof.

The dust collector is preferably formed with a generally conical body portion 12, which is shaped in approximate conformation with the vortex formed as a result of the tangential introduction into its upper portion 13 of the phosphorus-containing gas. The upper portion 13 is of spiral section, and is somewhat larger in diameter than the largest portion of the body of the collector. The outlet 14 of the collector is positioned in the tops thereof at approximately the center of the vortex, and projects downwardly for a short distance into the enlarged upper portion of the collector. The outlet 14 opens into the conduit 15, through which the phosphorus-containing gases, deprived at least in part of their solid impurities, are removed.

In the operation of the collector, the dust and fume particles carried by the gases from the phosphorus volatilization furnace tend to adhere to the walls of the upper enlarged or inlet portion thereof by reason of their peculiar character, resulting from the nature of the change in such furnaces. In accordance with the present invention, I provide at a plurality of points around the periphery of the enlarged upper portion or head of the collector a plurality of water injecting nozzles 16, fan-like in form and communicating through pipes 17 with a suitable pressure water main (not shown). These fan-like water supply nozzles are positioned adjacent the internal walls of the head of the collector, and are disposed at an angle to the vertical so that the water supplied through them is distributed over substantially the entire inner vertical wall of the head or enlarged upper portion of the collector. Similarly, I dispose a plurality of fan-like nozzles 18 around the periphery of the head of the collector and adjacent the horizontal floor thereof, these nozzles being annularly disposed and communicating with the water pipes 19. These pipes enter the nozzles at an angle to the wall of the collector, being arranged approximately tangentially to the opening of the body portion 13 of the collector. The water pipes 19 communicate with a suitable pressure water main (not shown). The nozzles 18 are so disposed around the spiral periphery of the head of the collector that, on supply of water thereto, the spray from them substantially covers the entire horizontal portion or floor of the head of the collector.

By similar nozzles 20 and water supply pipes 21, water under pressure may be supplied to the mains leading to and from the collector. In operation, the gases from the volatilization furnace pass through the main to the collector at fairly high velocities, say from 15 to 28 feet per second. At intervals, as the accumulations of fume and dust become excessive, the water is turned on to the pipes 17 and 19 leading to the nozzles 16 and 18. The arrangement of the nozzles and water supply pipes, together with the velocity of the gas, cause the water to cover and sweep around the walls and horizontal floor of the upper portion or head of the collector and the wash water, carrying with it dust and fume washed from the wall. The water then flows down the conical body of the collector, exercising a washing and cleaning action thereupon. The wash water may be removed through the bottom outlet 22 of the collector.

In general it is not necessary to await the cessation of gas flow in order to clean the walls of the mains and collectors in the manner described, the velocity of the gas aiding in the washing action of the water; but if desired, the head and body of the collector may be washed down by the means shown when no gas is flowing through the system.

Water spray nozzles 20 (similar to nozzles 16 and 18) are provided in passages through which the phosphorus furnace gas pass, to spray water against the walls thereof and clean off dust and fume, this action being aided by the flow of gas as in cleaning the separator.

I claim:

1. A dust collector for gases from volatilization furnaces, said collector having a curvilinear head and tangential inlet thereinto, nozzles for the supply of cleaning liquid, said nozzles opening in proximity to a wall surface of said collector and being adapted to distribute a film of said fluid over the walls of the inlet head of said collector without substantial admixture with the gases whereby, on supply of the cleaning fluid, the motion of the fluid and the agitation of the gas entering the collector are effective to remove deposits from the wall thereof.

2. A dust collector having an enlarged inlet head with a tangential intake, said inlet head having a substantially horizontal floor portion, a plurality of nozzles around the periphery of said inlet head adjacent said floor portion and opening thereagainst, and means for supplying cleaning liquid to said nozzles, whereby said cleaning liquid may be distributed over the floor portion of said enlarged inlet portion during passage of gas therethrough.

3. A dust collector having an enlarged portion with a tangential intake and substantially horizontal walls, a plurality of nozzles around the periphery of the top of said inlet portion adjacent the vertical walls thereof, said nozzles being adapted to distribute a film of cleaning liquid over said cylindrical walls, and means for supplying cleaning liquid under pressure.

HARRY F. NOYES.